3,564,657
INJECTION MOLDING MACHINE
Katashi Aoki, 6037 Oaza Minamijo, Sakaki-machi,
Hanishina-gun, Nagano-ken, Japan
Filed Jan. 16, 1969, Ser. No. 791,737
Claims priority, application Japan, Jan. 20, 1968,
43/2,977; Jan. 24, 1968, 43/4,179
Int. Cl. B29f 1/00
U.S. Cl. 18—30                                   7 Claims

ABSTRACT OF THE DISCLOSURE

An injection molding machine of the type having female mold and male mold reciprocable into and out of contact with the female mold, including limit switch means for testing whether the molds have been cleared fully and are in condition for a sequential molding step.

DETAILED DESCRIPTION OF INVENTION

There have been devised many kinds of metal molds for injection molding machine. However, in those machines where the products are formed by a pin point gate from the bottom of the female mold, it is necessary to open and close the female mold and the runner plate to remove the sprue runner. In conventional opening and closing method of this kind, the mold opening is completed by opening the female and male molds after the runner plate and the female mold have been opened, and conversely, it is usual that mold clamping is completed by abutting the female mold with the runner plate after the male and the female mold have been closed, and the opening and closing operation is effected also by using the mold clamping mechanism arranged on the side of the male mold.

In an injection machine, in which, with an exception of the case where the opening and closing operation of the mold is conducted at the same speed, and, in order to increase the efficiency of the operation, the mold clamping mechanism is operated at a high speed until immediately before the clamping of the molds, and the clamping of the molds is completed at low speed, the opened female mold is situated in a range of high speed operation of the mold clamping mechanism, so that the male mold strikes violently against the female mold, damaging the metal molds at the clamping. In the opening, since the mold near the runner plate is opened first, the position of releasing the molded articles, that is, the opening position of the metal molds is located within the high speed operation of the mold clamping mechanism and the release of the molded articles is effected rapidly, a tension produced at the mold opening is applied on the moldings unevenly, and the molded articles are damaged at the moment they are released from the molds. Therefore, the clamping and the opening of the mold must actually be effected with restricted operable range even when equipped with a high speed capacity.

The present invention has eliminated all the above described disadvantages, the opening and closing operation differs from that of the conventional method, the mold opening is effected by opening the male and female molds, and after the molded articles are released from the molds, and is completed by opening the male mold and the runner plate, while the mold clamping is effected by closing the female mold and the runner plate, and after which it is completed by abutting the male mold against the female mold.

The mold opening and closing operation is carried out by an interrelated operation of a mold clamping mechanism disposed at the male-mold side and a transfer mechanism mounted at the female-mold side. The transfer mechanism prevents the female mold from being transferred with the male mold during the release operation by the retreat of the mold clamping mechanism to open the male mold after the injection molding, and releases the sprue runner from the runner plate by pushing out the female mold after the releasing. The female mold transfer mechanism operates before the mold clamping mechanism makes the forward motion to draw back the female mold towards the runner plate to prepare the next mold clamping.

In the present invention, in which the above described process forms one of its characteristics, the position of clamping and opening of metal molds is situated within the range of the low speed operation of the mold clamping mechanism due to the transfer of the female mold operated by a separated transfer mechanism, it is possible first to forward the male mold at high speed, and after which effecting the mold clamping at low speed, or mold opening at low speed, then to retreat the male mold at high speed, so that there is no disadvantage as experienced heretofore, and the clamping and opening of molds can be effected smoothly and rapidly.

Furthermore, according to the present invention, in which said process forms one of its characteristic features, it is possible to inspect automatically whether the moldings sprue runner, etc. are released perfectly from the molds in the mold clamping process. That is, the metal mold in the side of the movable base plate is positioned by stopping once at an appropriate spacing to the metal mold in the side of the fixed base plate, or by reducing the speed before the completion of the clamping process, then pushing out the metal mold which has been connected to said transfer device towards the other metal mold, and to inspect whether molded articles, sprue runner or so are remained or not between the molds as foreign matters.

This inspection can be applied not only between a pair of metal molds, but also for the case where mold releasing portion is formed of a combination of a plurality of molds. When only one portion is to be inspected for foreign matters, the inspection is effected by singly transferring one of the male or female molds, and in the case where the inspection is effected by transferring the male mold side, the metal mold base plate and the male mold, male mold itself, one portion of the male mold are transferred singly. When the inspection of foreign matters is effected by transferring female mold side, it is preferable to transfer only the female mold as considered from the construction of the metal molds, separated two released portion of molds can be inspected successively by a reciprocating motion of the female mold.

The conventional method of inspecting foreign matters is so adapted that the inspection of the foreign matters at the released surfaces of metal molds is effected while operating the mold clamping mechanism, and when some foreign matter is found, the metal mold operated at a constant speed at the side of the moving base plate is stopped suddenly. However, it is quite difficult to stop the powerful mold clamping mechanism at the same time the foreign matter is found, and at times the metal mold may be violently abutted onto the other metal mold together with the foreign matters, resulting in damages at the released surfaces of a pair of metal molds. In the apparatus according to the present invention, however, a device transferring the male or female molds separately is mounted to a tie bar or so through the fixed or movable plate or the attachment, and provided with a limit switch which operates the mold clamping mechanism by contacting the contacts of the switch when each of the metal molds is closed at a normal condition and an electric circuit for said operation, so that the clamping of the mold, which is to be effected successively to the closing of molds, is not effected when some foreign matter due to an incomplete release at the released surfaces of the metal molds, and an alarm buzzer for detecting foreign matter is sounded and informing without delay that the injection molding operation cannot be effected even when the operation is carried out without the operators preventing damages of the metal molds.

The method and apparatus according to the present invention will now be described in detail with examples referring to the drawings.

In the drawing, the same parts are designated by the same reference numbers omitting the detailed explanation.

FIGS. 1–13 show an injection molding machine equipped with pin point gate type metal molds, in which FIGS. 10–13 show essential parts of an inspection mechanism mounted between the female mold and the runner plate, FIGS. 14–26 show each of examples of injection molding machines equipped with side gate metal molds, in which

In each of the drawings, the numeral 1 is a mold clamping mechanism including the mold opening and closing mechanism 2, and is provided with an oil pressure device 4 for operating mold clamping through a crank arm 3. The numeral 5 is a movable base plate connected with the crank arm 3, and which reciprocates on tie bars 6, 6 horizontally. The numeral 7 is a fixed base plate provided opposedly to said movable bed plate 5, and a nozzle of an injection heating cylinder 8 is arranged at the central portion of said plate 7.

FIGS. 1 through 13 show an injection molding with a pin point gate, wherein the female mold 11 situated between the male mold 10 mounted on the opposing surface of the movable base plate and a runner plate 9 mounted on the opposing surface of the fixed base plate 7 is connected to a pair of transfer mechanisms 13′, 13′ driven by oil pressure and fixed on the side of the injection molding machine, and so constituted that the female mold 11 is independently transferred by operation of said transferring mechanisms.

The mounting position of the transfer mechanisms 13′ may be in any range where the female mold 11 can be transferred reciprocatingly and horizontally and is not limited to a certain position.

For example, in FIGS. 1 through 7, a plurality of oil pressure cylinders 13, 13 are arranged on the fixed bed plate 7, the piston rods 14, 14 thereof are connected to female mold 11 through the runner plate 9, causing the female mold 11 to transfer separately through the reciprocating motion of the piston rods 14, 14.

Said transfer mechanisms 13′, 13′ are arranged by an ordinary means to cooperate with the oil-pressure operated mold opening and closing mechanism 2 for the crank arm 3 which feeds the movable bed plate 5 quickly, and operates independently with the mold clamping mechanism 1, to release the female mold 11 from the runner plate 9 or to set it, while acting to draw the female mold 11 intensely to the side of the runner plate during the injection and when the male mold is retreated.

Figures 1, 1I:
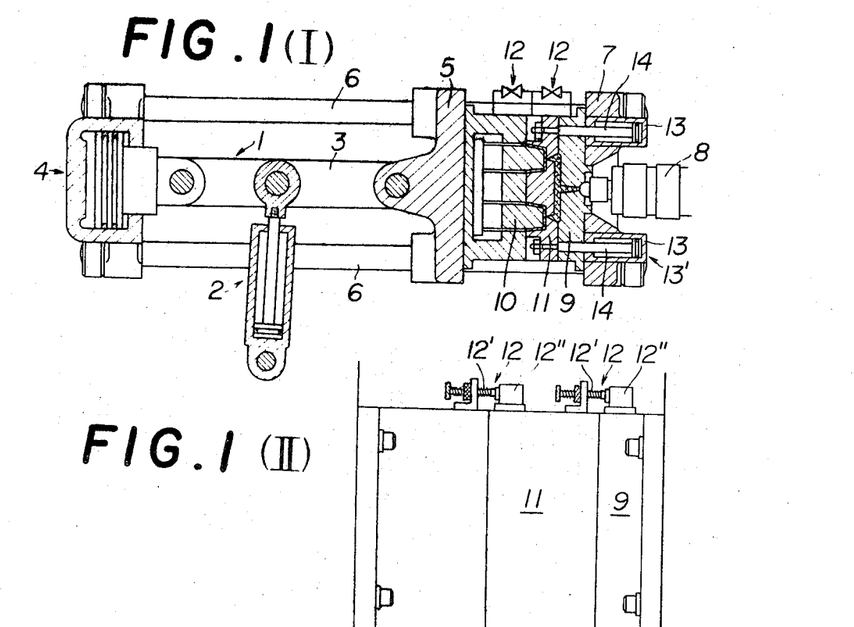
FIG. 1(I) is a longitudinal, sectional elevation at the injection molding, FIG. 1(II) is a front elevation of the change-over portion.
Figure 2:
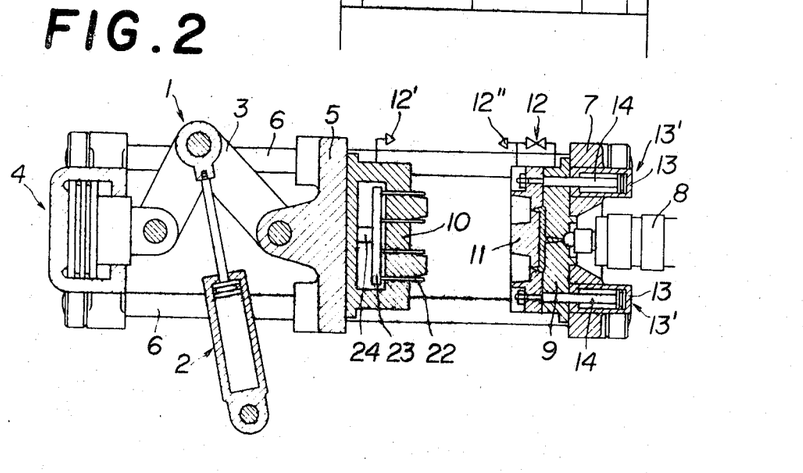
FIG. 2 is a longitudinal, section elevation at the mold releasing of molded articles.

To open the molds clamped as in a state shown in FIG. 1 after the injection molding, releasing the mold-clamping by operating the transfer mechanisms 13′, 13′ as shown in FIG. 2, then continuously operating the mold opening and closing mechanism 2, causing the male mold 10 together with the movable bed plate 5 to retreat quickly by the crank arm 3.

In this moment, with the conventional method, the female mold 11 transfers with the male mold 10 and previously opens the mold between the runner plate 9, but with the present invention, since the female mold 11 is held by the transfer mechanisms 13′, 13′, the male mold 10 alone opens and releases the molded articles.

Figure 3:
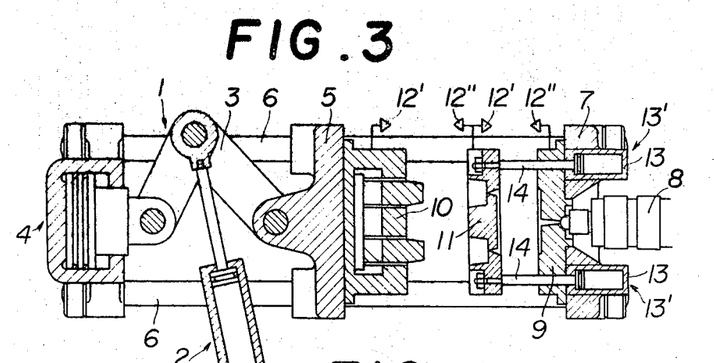
FIG. 3 is a longitudinal, sectional elevation at the releasing of the runner.

When the male mold retreats up to a predetermined position, the female mold transfer mechanism is operated to push the piston rods 14, 14, and the runner plate 9 is opened to a state as shown in FIG. 3, the sprue runner beig released and the mold opening step is completed.

Figure 4:
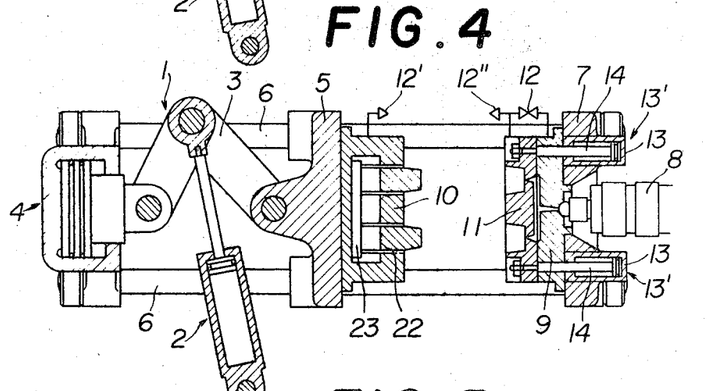
FIG. 4 is a longitudinal, sectional elevation showing an inspection of complete release of the runner.

In the mold clamping step, the transfer mechanisms 13′, 13′ operate previous to the mold opening and closing mechanism 2, the female mold 11 is drawn back to the side of the sprue runner 9 as shown in FIG. 4, then the mold opening and closing mechanism 2 operates to feed the male mold 10 quickly by the crank arm 3, and finally all of the metal molds are clamped slowly as shown in FIG. 1 by the operation of the oil pressure device 4.

Consequently, even when the male mold is operated at high speed, the opening and clamping of the metal molds can be effected at low speed, thus eliminating the inconveniences experienced when the opening and clamping of molds were effected at high speed, and the injection molding operation can be carried out more rapidly.

Next, in case where it is necessary to inspect whether there is some foreign matter on the released surfaces of metal molds, a device is arranged which actuates the mold clamping mechanism when a pair of metal molds contact correctly and a perfect registering of metal molds is obtained at or near the same position as shown in the drawing. As shown in FIG. 1(II), this device is limit switches 12, 12, which are comprised of switch members 12', 12' fixed on the female mold 11 and runner plate 9, and push rods 12", 12" fixed correspondingly thereto on the male mold 10 and the female mold 11.

Figure 29:
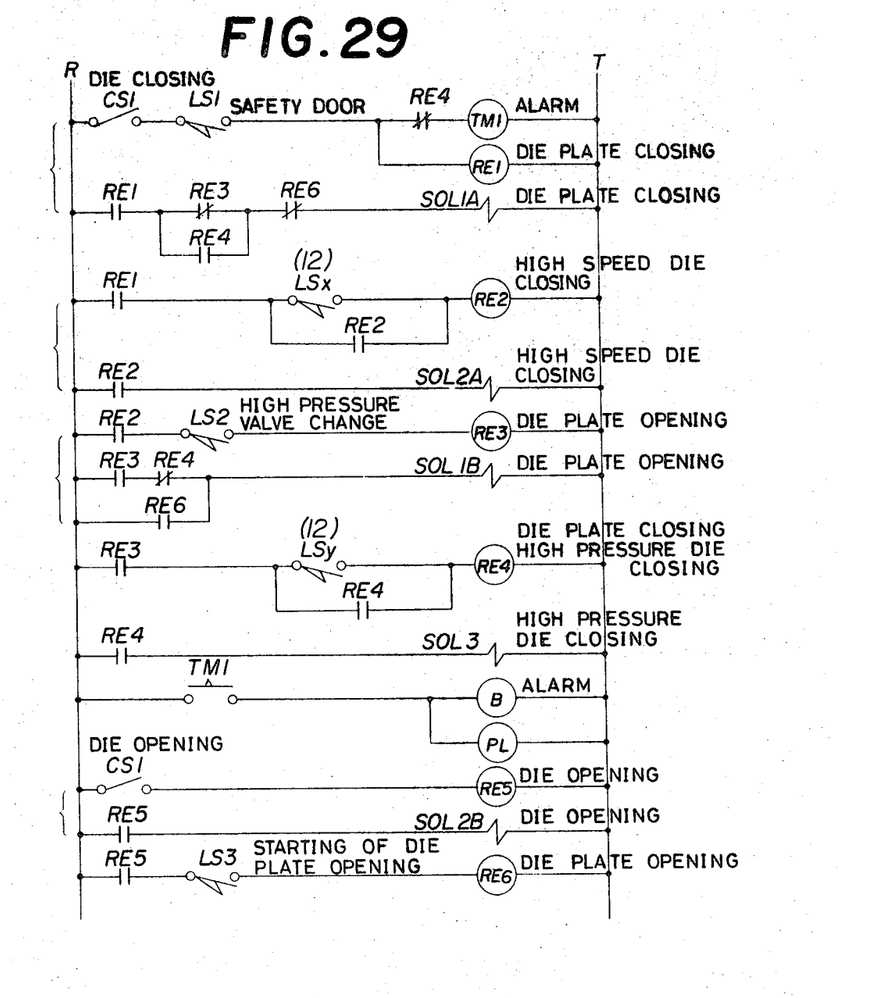

These limit switches 12, 12 are incorporated in an electric circuit shown in FIG. 29. Thus, in a high speed mold closing circuit extending from the circuits R to circuit T, a limit switch 12, which is shown as LSx at the side of the runner plate, is connected in series between a relay RE1 and a relay electromagnetic coil RE2 and in parallel with a relay RE2. A limit switch 12, which is shown as LSy at the side of female mold 11, is connected in series between a relay RE3 and a relay electromagnetic coil RE4 and in parallel with a relay RE4.

In this circuit a solenoid SOL1A of the mold closing circuit is operated by a mold closing switch CS1, and while transferring the female mold in the direction of runner plate, operating an alarm timer TM1. When LSx is pushed by the transfer of the female mold 11 and the circuit is closed, a high speed mold closing is commenced. When the high voltage change-over limit switch LS2 is pushed, said solenoid SOL1A is switched to SOL1B, and changes the transferring direction of the female mold. Next, when the female and male molds are brought close together and the limit switch LSy is pushed, the solenoid is switched to SOL3, and a high-voltage mold closing is commenced, the injection molding begins when said closing is completed.

In this case, when some foreign matter is interposed between the male mold, female mold, and runner plate, and consequently the limit switches LSx, LSy are not pushed, the high speed mold closing circuit and high voltage mold closing circuit are not closed, the mold closing operation is interrupted temporarily, and after a predetermined period, abnormality is informed by means of a lamp LP and a buzzer B.

Now the inspection of said mold opening and closing device will be described referring to the drawings. After the injection molding is finished as shown in FIG. 1, mold transfer mechanism 2 is operated in a direction of mold opening as shown in FIG. 2 by means of conventionally constituted oil pressure device, which actuates each part successively, the electrical circuit and the view thereof are not shown, releases the male mold 10, and releases the molded article by action of knock-out pin 22 provided on a plate 23 of a knock-out ram 24. In this case, with the conventional injection process, the female mold 11 is transferred with the male mold up to a predetermined position, but the female mold 11 connected with piston rods 14, 14 constituting a part of the transfer mechanisms 13', 13' does not transfer with the male mold due to a pressure in an oil pressure cylinder 13 but maintains in contact with the runner plate 9. Next, when the male mold is retreated completely to a predetermined position, the female mold 11 is pushed out by the piston rods 14, 14, opening the space between the female mold 11 and the runner plate 9 so the sprue is released.

When the release between the molded article and sprue is completed as stated above, the oil pressure cylinders 13, 13 are pressurized gradually in a reverse direction prior to operate the mold clamping mechanism 1 to return the female mold 11 to the runner plate 9. Now, when the release of the molds are perfect and there is no foreign matter between both of the released surfaces, the female mold 11 returns to a state as shown in FIG. 4, and each of the limit switches 12, 12 is connected to start the oil pressure circuit (not shown) of the mold clamping mechanism 1, the crank arm 3 extending to its full length by the operation of the mold opening mechanism 2, and the male mold 10 is quickly fed together with the movable plate 5 till they confront to the female mold 11 at a spacing of 10 to 20 mm.

Figure 5:
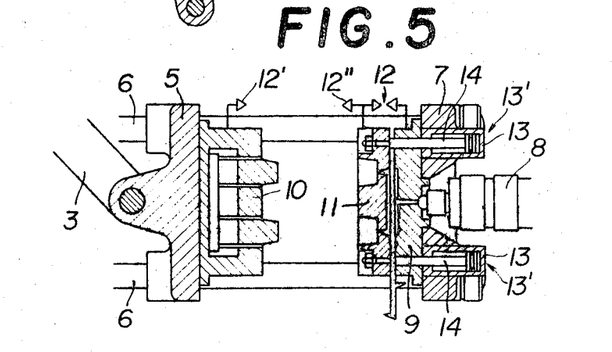
FIG. 5 is a longitudinal, sectional elevation showing an inspection of incomplete release of the runner.

In the case, however, when foreign matters such as sprue or the fragments thereof are remained between the runner plate 9 and the female mold 11, the male mold 10 does not return perfectly as shown in FIG. 5, each of the limit switches 12, 12 are in a separated state and are unable to start the oil pressure circuit, so that the mold clamping operation, which is to be effected successively, is stopped at a state of opened molds, and at the same time disabled operation is informed.

Figures 6, 7:
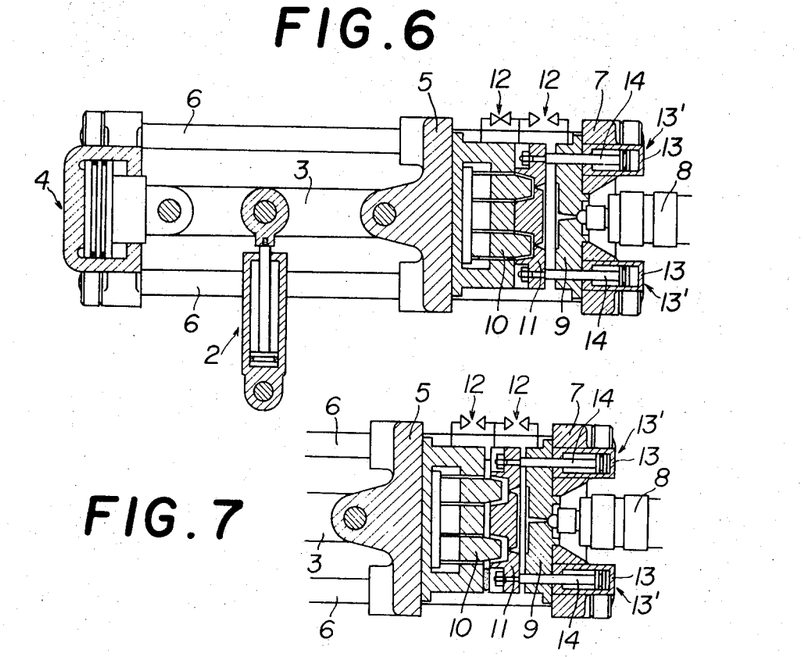
FIG. 6 is a longitudinal, sectional elevation showing an inspection of complete release of the molded articles.
FIG. 7 is a longitudinal, sectional elevation showing an inspection of incomplete release of the molded articles.

When the male mold is quickly fed to a predetermined position and then reduced its speed or stopped once, the cylinders 13, 13 are pressurized in a direction to push the piston rods 14, 14, transferring the female mold 11 to the side of the male mold 10, and the molds are tried for closing. At this time, if there is no foreign matter between both molds having been perfectly released of the molded article, the female mold 11 and the male mold 10 contact with each other as shown in FIG. 6, then the limit switches 12, 12 are contacted and operate electrically the oil pressure device 4 of the mold clamping mechanism 1, and the female mold 11 and the male mold 10 are pressed together to effect the clamping as shown in FIG. 1. At this time it is necessary to reduce the pressure in the oil pressure cylinders 13, 13 of the transfer mechanism so that the female mold 11 can be retreated together with the piston rods 14, 14.

Contrary to this, when the releasing state of the molded article is not favorable, that is, one part or whole of the molded article is left between the metal molds, the female mold 11 does not contact with the male mold 10 when the former is pushed, the limit switches 12, 12 are out of contact as shown in FIG. 7 and become unable to operate the oil pressure device 4 of the mold clamping mechanism 2, and the clamping and injection molding processes to be followed are interrupted temporarily, so that the unoperable state can be informed as described previously.

Figure 8:
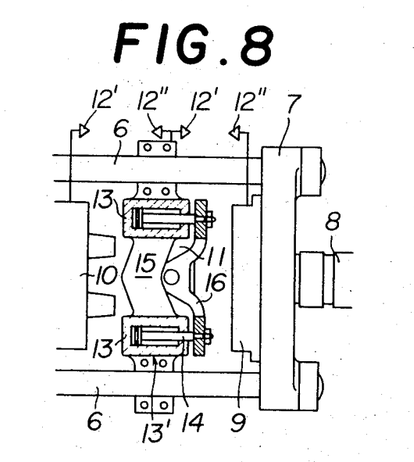
FIGS. 8 and 9 are partial elevations in longitudinal section showing manner at opening and closing of molds when the transfer mechanism is mounted on the female mold through an attachment.
Figure 9:
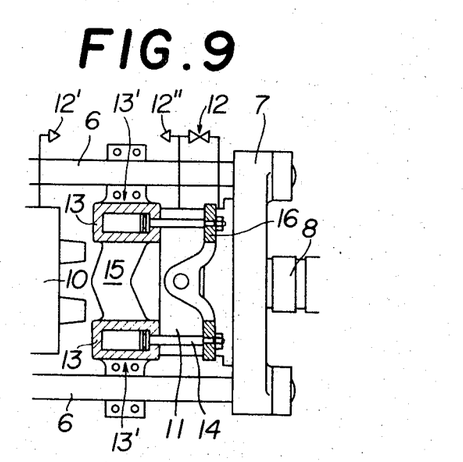

FIGS. 8 and 9 show an embodimental Example 2 wherein the oil pressure cylinders 13, 13 are mounted in parallel with an attachment 15 fixed to the tie bars 6, 6, and the piston rods 14, 14 are connected to a supporting plate 16 screwed on the female mold 11, and the female mold is transferred singly. The transfer mechanism 13', which is comprised of an oil pressure cylinder 13 and a piston rod 14, presents the same function as in the Example 1 shown in FIGS. 1 to 7 independent of the mounting position.

Further, FIGS. 10 to 13 show another Example 3, wherein the oil pressure cylinders 13, 13 are fixed at the peripheral portion of the female mold 11, and the female mold 11 is caused to transfer singly by the reciprocating motion of piston rods 14, 14 connected to the seat plate 16' of the runner plate 9 through said peripheral portion.

Figure 10:
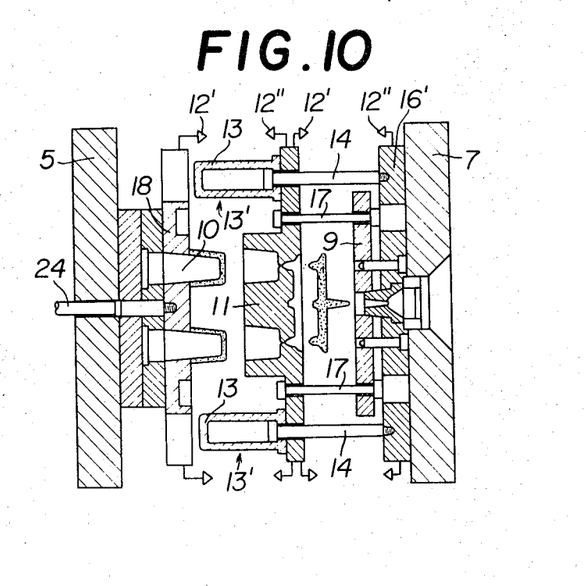
FIG. 10 is a longitudinal, sectional elevation of metal molds which are fully opened.
Figure 11:
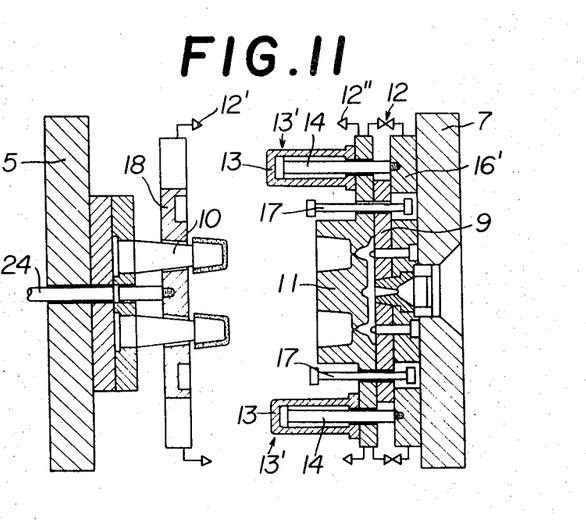
FIG. 11 is a longitudinal, sectional elevation at the inspection of complete release of runner.
Figure 12:
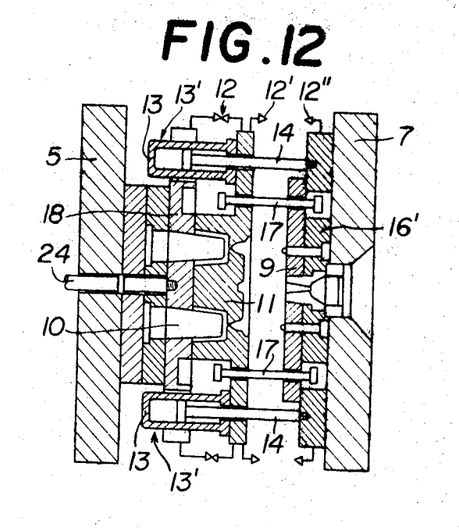
FIG. 12 is a longitudinal, sectional elevation at the inspection of complete release of molded articles.
Figure 13:
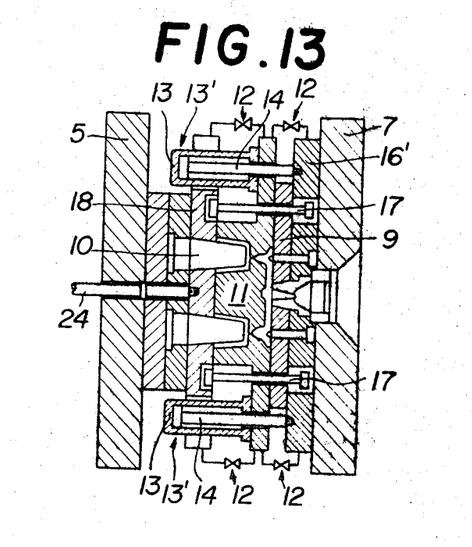
FIG. 13 is a longitudinal, sectional elevation at the clamping.

In the case of these Examples 2 and 3, since the oil pressure cylinder 13 is fixed to the attachment 15 or the female mold 11, it is possible to apply it on the existing injection molding machine. In Example 8, as illustrated in FIGS. 10 and 11 the female mold 11 and the runner plate 9 are connected by tension pins 17, 17, the sprue runner can be positively released by moving the runner plate 9 when the female mold 11 has arrived at the final transfer position. On the other hand, a knock out plate 18 may be provided on the male mold side together with a knock out ram 24 for positive release of molded articles, and if required, said limit switch 12 may be provided on said knock out plate 18.

Figure 14:
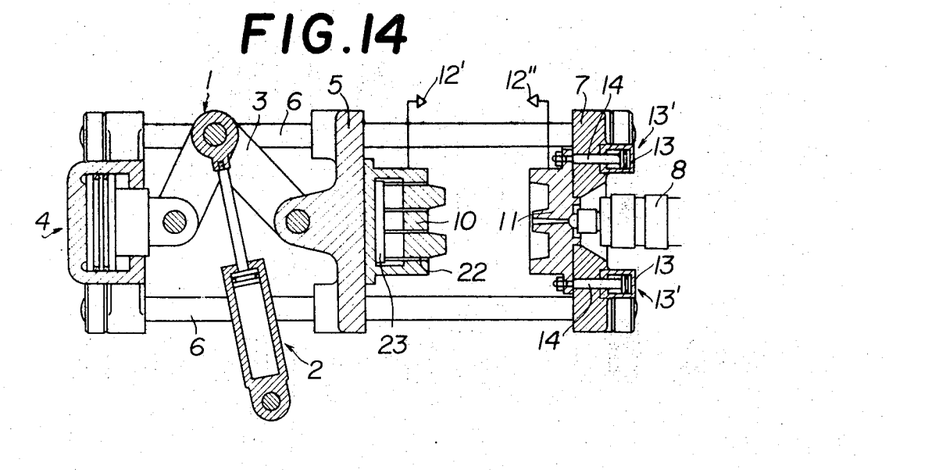
FIG. 14 is a longitudinal, sectional elevation when the metal molds are opened.

An example, shown in FIG. 14 and the following, is a case in which the injection molding is effected using a side gate. In this case, since the runner plate is not used, the inspecting portion of foreign matters is needed only between the male and female molds, and does not necessitate the LSx of the high speed mold closing circuit. Consequently the mounting position of transfer mechanism is not restricted to the female mold side, and the same function and effect can be obtained even when it is arranged on the male mold side.

Figure 15:
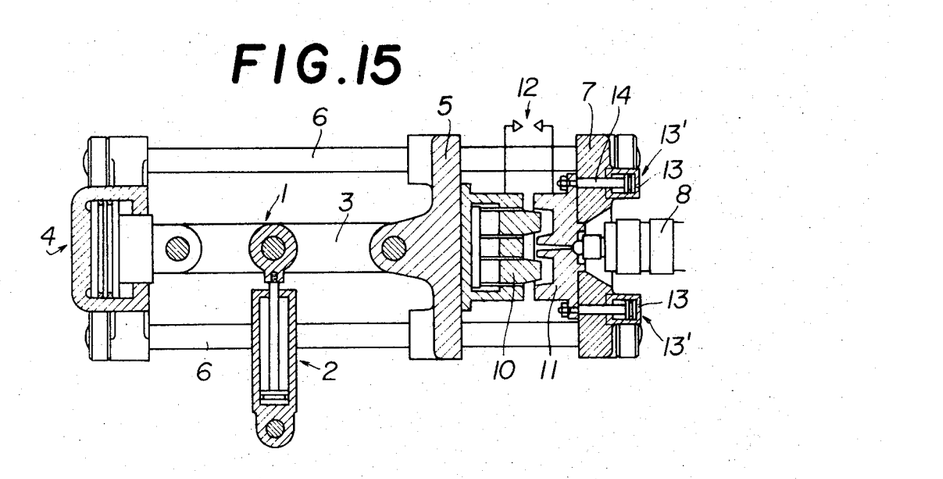
FIG. 15 is a longitudinal, sectional elevation before the clamping of molds is completed.
Figure 16:
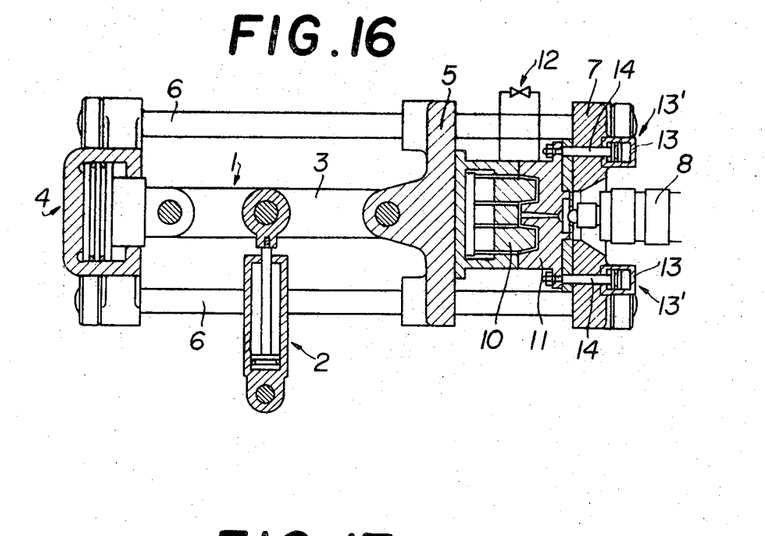
FIG. 16 is a longitudinal, sectional elevation at the inspection of complete release of molded articles.

In the Example 4 shown in FIGS. 14 to 16, the oil pressure cylinders 13, 13 are mounted on the fixed base plate 7, the piston rods 14, 14 are connected to the female mold 11 which is arranged on the opposed surface of the fixed base plate so as transferrably to support the female mold freely.

Accordingly, in the inspection process of foreign matters in this case, the male mold 10 opened in a state shown in FIG. 14 is quickly transferred to a state shown in FIG. 15, and, as in the case of the pin point gate, after stopping once the male mold at a spacing of 10 to 20 mm., actuating the oil pressure cylinders 13, 13 as in the state shown in FIG. 16, pushing the female mold 11 towards the male mold 10 through the piston rods 14, 14, and inspect whether there is any foreign matter between both metal molds by means of the limit switches 12, 12 to see if their contacts are connected or not.

In the Example 5 shown in FIGS. 17 to 21, there are shown the case in which the transfer mechanisms 13′, 13′ are arranged on the side of the male mold, the male mold 11 is fixed on the opposing surface of the fixed bed plate 7 contrary to the case shown in above Example 4, and the male mold 10 is transferrable singly by the transferring mechanism consisting of a plurality of oil pressure cylinders 13, 13 mounted over the movable bed plate 5 and the seat plate 20 of the metal mold, and piston rods 14, 14.

Accordingly, the inspection of foreign matters in this case proceeds as follows: the male mold 10 opened in the state as shown in FIG. 14 is quickly transferred to a state shown in FIG. 15, and after stopping once at a distance of 10 to 20 mm. as in the case of pin point gate, actuating the oil pressure cylinders 13, 13 to the state shown in FIG. 16, and pushing the female mold 11 towards the male mold 10 through piston rods 14, 14 then existence if any of foreign matter between both metal molds can be detected by the limit switches 12, 12 whether they make contact or not.

In the Example 5 shown in FIGS. 17 to 21, the transfer mechanism 13′, 13′ are arranged on the male mold side, the female mold 11 is fixed on the opposing surface of the fixed bed plate 7 contrary to the case of Example 4, the female mold 10 is transferrable singly by means of transfer mechanism consisting of a plurality of oil pressure cylinders 13, 13 mounted over the movable bed plate 5 and the mold seat plate 20, and piston rods 14, 14.

Figure 17:
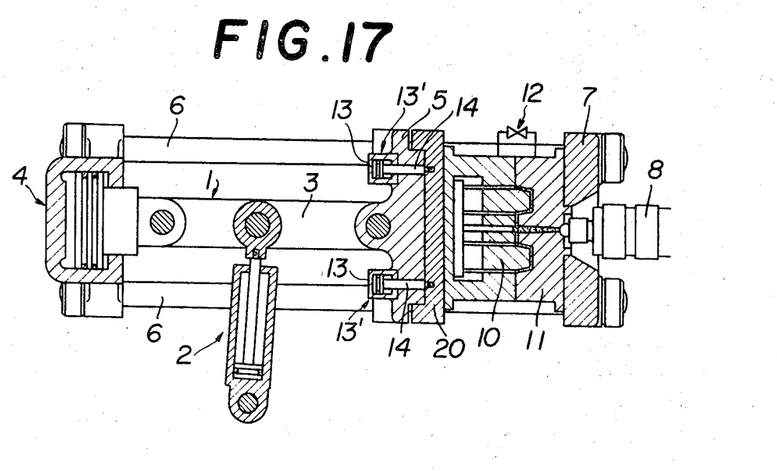
FIG. 17 is a longitudinal, sectional elevation of another embodiment shown at the injection molding.
Figure 18:
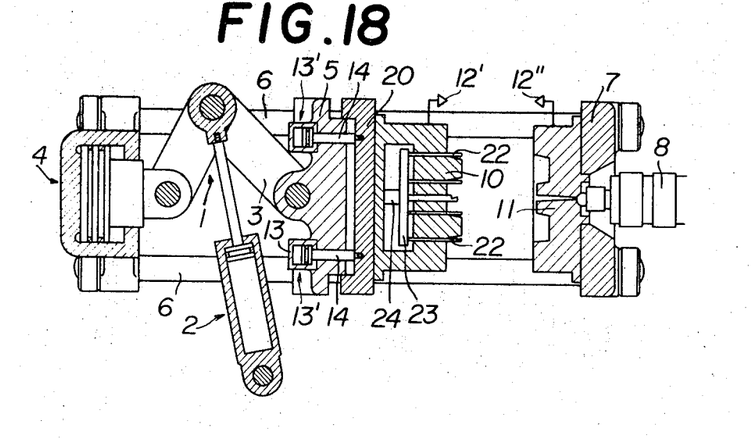
FIG. 18 is a longitudinal, sectional elevation when the metal molds are opened.
Figure 19:
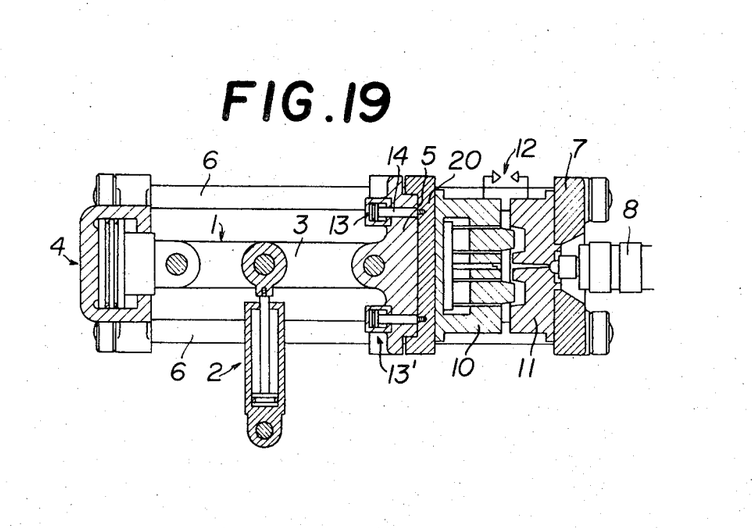
FIG. 19 is a longitudinal, sectional elevation of the molds just before the clamping.

In this example, the pressure in the oil pressure cylinders 13, 13 is first removed, then opening the male mold 10 from the state shown in FIG. 17 to that in FIG. 18, releasing the molded article, and after which the male mold 10 is quickly transferred to the state of FIG. 19 again together with the movable bed plate 5, and stop once keeping said spacing with the female mold 11. Then applying pressure in the oil pressure cylinders 13, 13, actuating piston rods 14, 14 and pushing the male mold 10 together with the metal mold seat plate 20 towards the female mold.

Figure 20:
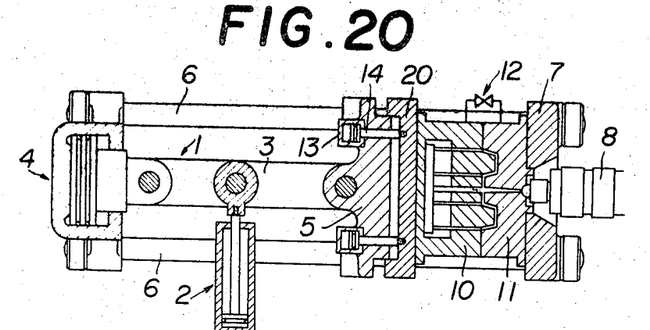
FIG. 20 is a longitudinal, sectional elevation at the inspection of a complete release of molded articles.
Figure 21:
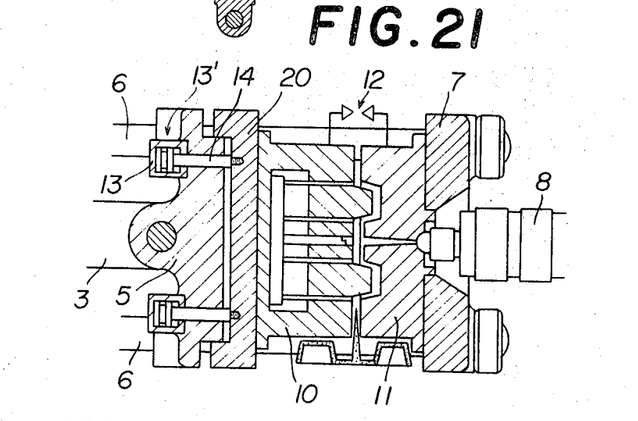
FIG. 21 is a longitudinal, sectional elevation at the inspection of an incomplete release of molded articles.

FIG. 20 shows the normal state where no foreign matter exists between the metal molds, and the limit switches 12, 12 and the divided surfaces of metal molds are in contact respectively, when, however, some foreign matter exists between the metal molds, the foreign matter is detected in a state as shown in FIG. 21.

The mold clamping, which is to be effected following the inspection of the foreign matters, is effected by pushing the movable bed plate 5 by means of oil pressure device 4 of the mold clamping mechanism.

Figure 22:
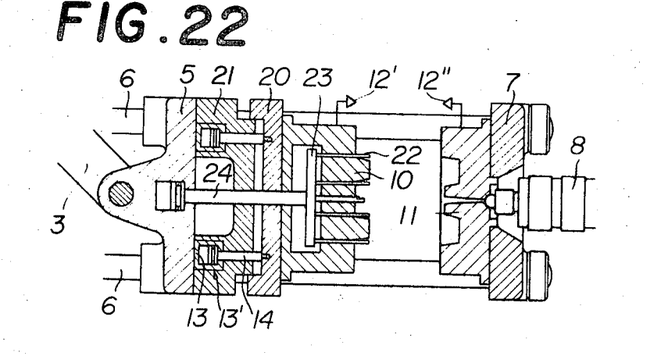
FIG. 22 is a longitudinal, sectional elevation similar to FIG. 18 the mounting means of the transfer mechanism is somewhat changed.

In the example shown in FIG. 22, a base plate 21 is further interposed for arranging oil pressure cylinders 13, 13 between the movable bed plate 5 and the metal mold seat plate 20, the process of inspecting foreign matter is the same as the examples shown before.

Figure 23:
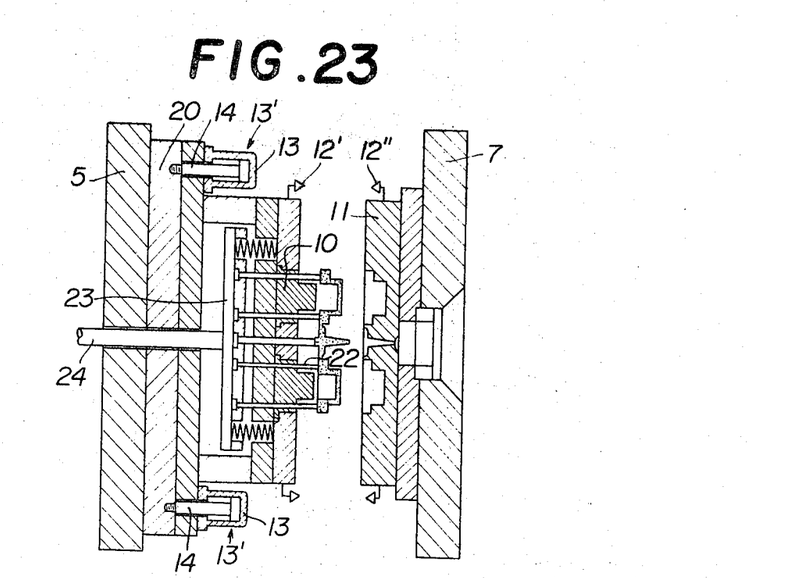
FIGS. 23 and 24 are longitudinal, sectional elevations of the other example inspecting foreign matters in pushing all of the male mold, and showing the essential parts at the releasing of the molded articles and the inspection of perfect release of the molded articles.
Figure 24:
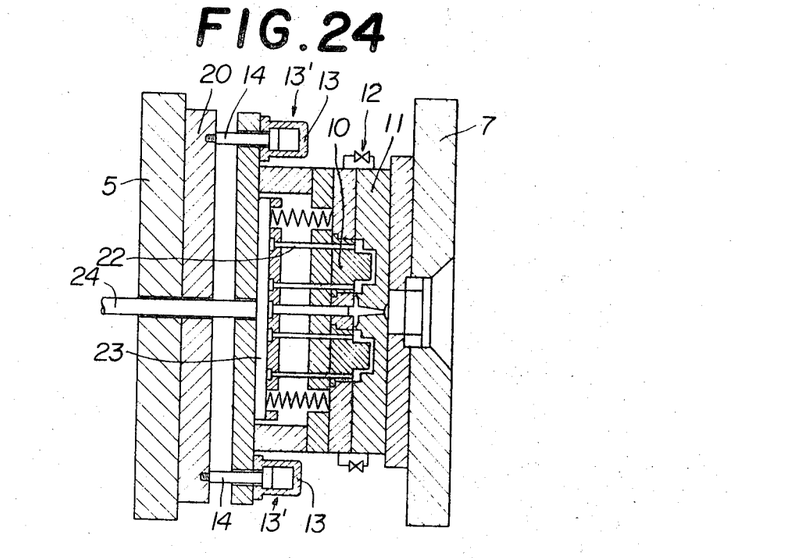

In the Example 6 shown in FIGS. 23 and 24, the oil pressure cylinders 13, 13 are mounted on the periphery of the male mold, and the piston rods 14, 14 are connected to the metal mold seat plate 20 fixed on the movable bed plate 5, pushing only the male mold 10 to the state shown in FIG. 24 so as to allow the inspection of foreign matters.

Figure 25:
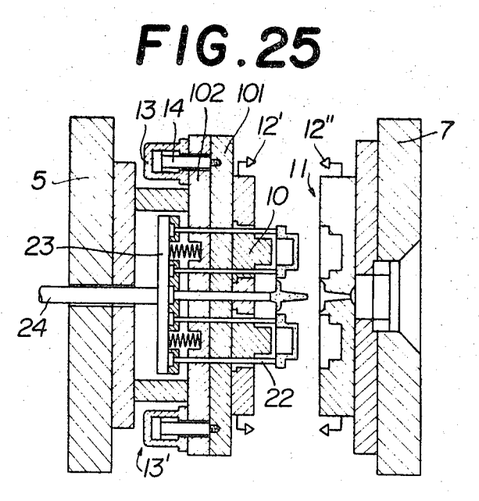
FIGS. 25 and 26 are longitudinal, sectional elevations of essential parts showing the mold releasing of the molded articles at the inspection by pushing a part of the male mold, and the inspection of perfect release of molded articles.
Figure 26:
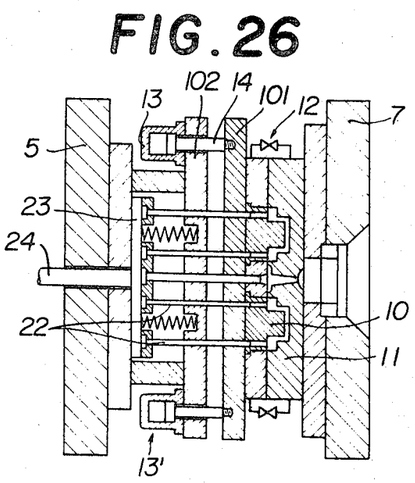

In the Example 7 shown in FIGS. 25 and 26, the male mold 10 is divided into the movable part 101 and the fixed part 102, and the oil pressure cylinders 13, 13 and the piston rods 14, 14 are disposed on both of said parts 101, 102, and by pushing the movable part 101 connected to the tip end of the rod towards the female mold 11 as in a state shown in FIG. 26, the inspection of the foreign matter can be effected.

Figure 27:
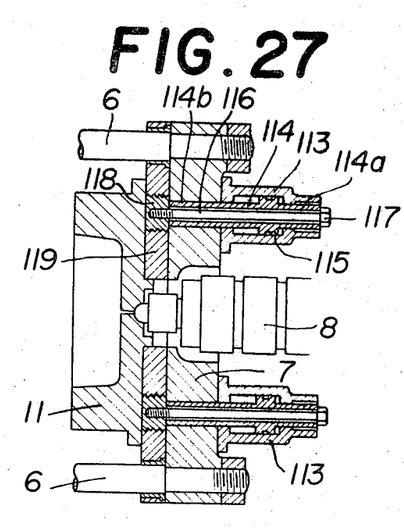
FIGS. 27 and 28 are longitudinal, sectional elevations of a transfer mechanism according to another example showing the essential parts, differing in their connections with the metal molds, and, FIG. 29 is an electric circuit diagram operating the mold opening and closing device successively.
Figure 28:
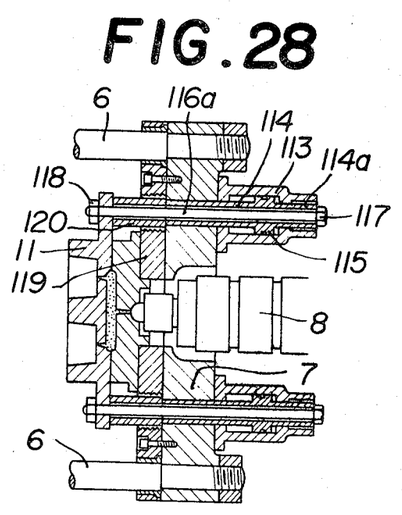

The example shown in FIGS. 27 and 28, is a case in which an oil pressure mechanism, of which the piston rod having a predetermined length can be utilized more longer than its axial length, is used as the transfer mechanism 13′, the numeral 113 is an oil pressure cylinder having through holes at both ends, 114 is a tubular piston having a predetermined length, and a pressure receiving flange 115 is integrally formed at a portion on the shaft so that the rear shaft portion 114a can be transferred over the inner and outer sides of the cylinder. The numeral 116 shows an elongated bolt inserted through the inner portion of the tubular piston 114, the head portion 117 received by the rear end face of the piston is positioned at the side of a cover continuously provided at the rear end portion of the oil pressure cylinder 113, and the threaded end of the shaft protrudes out of the tip end portion 114 of the tubular piston 114, to which a nut 119 is fixed.

In the example shown in FIG. 27, the oil pressure cylinder 113 is secured at one side of the fixed plate 7, the actuating plate 119 is supported between the tip end portion 114a of said tubular piston 114 acting through the through hole of the fixed plate and the nut 118 of the bolt 116, and the bolt 116 inside the piston is made integral with the piston 114 by mounting of said actuating plate 119.

In the example shown in FIG. 28, the actuating plate 119a which is situated more distant from the fixed bed plate 7 than said actuating plate 119, is connected to the same oil pressure device. In such a case, the bolt 116 used in FIG. 27 is replaced by a longer bolt 116a, and a short cylindrical member 120, having any length which fills the gap between the tip end of the tubular piston 114 and the female mold 11, is mounted at the end of the shaft by inserting it into the threaded hole of the actuating plate 119 in which said nut 118 has been located. After which the actuating plate 114a is supported by and connected integrally with said short cylindrical member 120 and the nut 118, so that it can be used equally as in the case shown in FIG. 27.

What I claim is:
1. An injection molding machine comprising:
 (A) a base having a plurality of longitudinally extending tie bars;
 (B) a movable bed plate supported at one side of said tie bars;
 (C) a fixed base plate, supporting an injection nozzle and mounted upon another side of said tie bars;
 (D) a first mold secured inwardly of said movable bed plate;
 (E) a runner plate supported inwardly of said fixed base plate and including an injection passage;

(F) a second mold having an injection port registering with the injection nozzle of said runner plate and supported inwardly of said runner plate, so as to be reciprocable away from said runner plate and towards said first mold;

(G) a mold opening and closing mechanism connected to said movable bed plate, so as to reciprocate said movable bed plate and said first mold into complementary engagement with said second mold; and (H) control mechanism for extending said second mold away from said runner plate during mold opening and returning said second mold to said runner plate prior to mold closing.

2. An injection molding machine as in claim 1, including:

(I) a pair of pistons extending through said fixed bed plate and said runner plate into said second mold, together with pressurization means contacting said pistons so as to extend said second mold inwardly away from said runner plate and towards said first mold.

3. An injection molding machine as in claim 2, including:

(J) limit switch means interconnecting said first mold and said second mold, so as to determine whether there is any foreign matter between said molds prior to closing of said second molds with each other.

4. An injection molding machine as in claim 3, said second mold being female and said first mold being male.

5. An injection molding machine as in claim 4, including:

(K) control means interconnecting said first mold, said movable bed plate, and said fixed bed plate, so as to limit advance of said first mold towards said female during inspection, then to direct said first mold towards said second mold after inspection.

6. An injection molding machine as in claim 5, said second mold including independent actuating means for extending said female mold inwardly of said fixed runner plate towards said first mold and limit switches supported upon first mold and said second mold so as to contact each other and actuate the mold clamping mechanism when the surfaces of the molds initially contact each other indicating normal conditions.

7. An injection molding machine as in claim 6, said second mold being supported upon a plurality of oil pressure cylinder pistons extensible from cylinders mounted in said fixed base plate and extending through said runner plate and into said second mold and limit switch means interconnecting said second mold and said runner plate as an inspection device operatively connected to said pistons.

References Cited

UNITED STATES PATENTS

| | | | |
|---|---|---|---|
| 2,801,442 | 8/1957 | Moslo | 18—30X |
| 3,055,055 | 9/1962 | Cook et al. | 18—30 |

FOREIGN PATENTS

| | | |
|---|---|---|
| 1,021,126 | 2/1966 | Great Britain. |

H. A. KILBY, JR., Primary Examiner